United States Patent Office 3,162,854
Patented Dec. 22, 1964

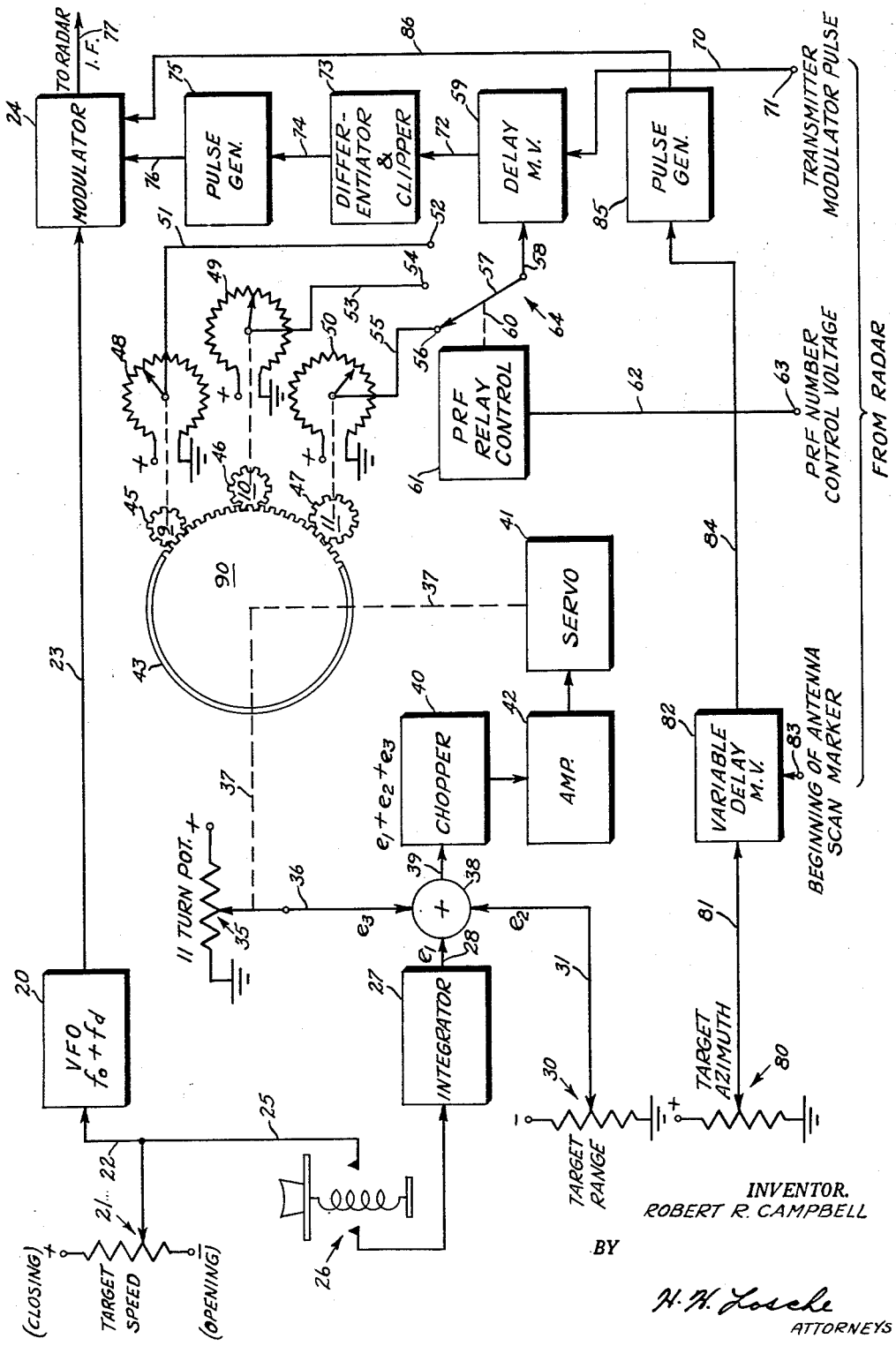

3,162,854
TARGET SIMULATOR FOR PULSE
DOPPLER RADAR
Robert R. Campbell, Towson, Md., assignor, by mesne assignments, to the United States of America as represented by the Secretary of the Navy
Filed May 8, 1961, Ser. No. 108,680
14 Claims. (Cl. 343—17.7)

This invention relates to radar target simulators and more particularly to a target simulator system for plural pulse repetition frequency types of pulse Doppler radars that are connectable to the intermediate frequency circuits of the pulse Doppler radar receivers to present indications of simulated targets in speed, direction, range, and azimuth with respect to the receiving radar position.

A number of radar target simulator devices have been devised and used for training and testing purposes, quite successfully. In some of these prior known devices a pulse generator is used to produce pulses that are acted upon by circuitry to provide simulated transmitted and reflected radar signals by delaying the simulated transmitted signal to produce the simulated reflected signal. Phantastron circuits have also been used to produce progressively varying simulated received pulses with respect to the simulated transmitted pulses to simulate "closing" or "opening" targets, or the simulation of targets that are moving toward or away from own position. Some of these target simulators are of the type that employ a perforated sheet of otherwise opaque material which sheet is interposed between a light source and a photoelectric cell to produce electric signals. These electric signals correspond to video signals that are supplied to the circuits of a plan position indicator (PPI) to visually indicate simulated targets which can be made to maneuver in accordance with the perforated sheet program. Some known means of simulating Doppler signals utilize such devices as ferrite modulators and traveling wave tubes to produce frequency shift in carrier frequencies to obtain the shift for simulated targets.

The present invention was contrived with the premise that a radar target simulator can be made and used for testing the operator or for renewing his alertness in observing targets as well as for testing or evaluating the operability and accuracy of the radar. After long periods of observing a radar indicator display, an operator's ability to see a target is reduced. A target simulator helps to renew this ability by reminding him how a target will appear. The target simulator could be programmed to generate random target parameters at random times to be most effective.

In the present invention a target simulator has been devised to be incorporated in a pulse Doppler radar system which can be switched into operation manually or by automatic programming means to produce simulated targets. A variable frequency oscillator is used to provide voltage oscillations in the intermediate frequency (IF) range and these voltage oscillations are made to vary in accordance with the "closing" or "opening" speed relation between the simulated target and the position of the equipment and the invention described herein, hereinafter referred to as "own radar" or "own position," to produce the Doppler effect. If the IF for the radar is 30 megacycles (mc.), for example, one speed voltage should produce the 30 mc. IF while higher and lower speed voltages will vary the IF output of the variable frequency oscillator to show "closing" and "opening" simulated targets, respectively. This IF is modulated by delayed pulses coming from the pulse Doppler radar, the delay of these pulses being produced by a delay monostable multivibrator under the control of a delay voltage selected from one of several potentiometers. These potentiometers are driven by a servo system operative upon the application of a voltage resulting from the combination of a simulated initial range voltage, a varying amount of voltage representing target speed, and a feedback voltage. Each of these potentiometers produces a delay voltage output to impose the proper delay in the delay multivibrator for a corresponding pulse repetition frequency (PRF) transmitted by the pulse Doppler radar. These delay voltages are selected by a selector switch in accordance with the switching of the radar PRF's. The frequency shifted signal, modulated by the delayed radar transmitter modulator pulses, is fed to the IF of the radar receiver where it will appear on the radar indicators as a real target. The modulator is turned on and off by radar antenna simulated azimuth position voltage pulses to provide modulated IF voltage information suitable to display speed, direction, range, and azimuth on the radar receiver indicators of a simulated target. It is therefore a general object of this invention to provide a target simulator circuit for incorporation in, or connection with, a pulse Doppler radar system to test both the radar and the operator and for the purpose of renewing the operator's ability in target detection and evaluation.

These and other objects and the attendant advantages, features, and uses of this invention will become more apparent as the description proceeds when considered with the accompanying drawing which illustrates the invention partly in block and partly in circuit diagram.

Referring more particularly to the drawing, a variable frequency oscillator 20 is used to produce frequency in a range about the IF of the pulse Doppler radar system (not shown) with which this target simulator is used. This frequency may be identified herein as $f_o$ designating the center IF, and $f_d$ is used to designate the frequency above or below the center IF. The frequency of the variable frequency oscillator 20 is varied in accordance with a voltage applied from the adjustable tap of a potentiometer 21 through the conductor 22, the resistance winding of the potentiometer being coupled across positive and negative supply terminals. The potentiometer 21 is adjustable to provide a potential representative of target speed, a more positive potential producing a higher frequency $f_o+f_d$ on the output of the variable frequency oscillator 20 than the center IF established by $f_o$ to indicate that the artificial target is "closing" or approaching own position which incorporates this target simulator. Likewise, a more negative potential applied by the potentiometer 21 to the variable frequency oscillator 20 will produce an output frequency $f_o+f_d$ lower than the IF established by $f_o$ indicating that the artificial target is "opening" or traveling away from own position that incorporates this target simulator. If the tap of potentiometer 21 is in a position to apply a voltage to the oscillator to produce the center IF, which oscillator could be designed to be internally biased so that zero external voltage would be required to produce the center IF, then the potentiometer 21 could be adjusted to its mid or zero voltage position to cause the oscillator 20 to produce the center IF. The output of the variable frequency oscillator 20 is applied by way of the conductor means 23 to a modulator 24 for being amplitude modulated and switched on and off by other signals which will be described later.

The target speed potentiometer 21 has the adjustable tap thereof also coupled through a conductor means 25 through a normally open switch 26 to an integrator network 27 for integrating the positive or negative target speed voltage as a voltage $e_1$ on the output 28 of the integrator 27. A potentiometer 30 has the resistance element thereof coupled between a negative voltage source and ground to produce a negative voltage $e_2$ on the output adjustable tap thereof and conductor 31 representative of the range of the artificial target. The more negative the adjustable tap of potentiometer 30 becomes, the greater the range of the artificial target from own position incorporating the target simulator. A feedback potentiometer 35 has the resistance element thereof coupled between a positive voltage source and ground to produce a positive voltage $e_3$ on the adjustable tap output thereof. This potentiometer 35 is illustrated herein as an eleven-turn potentiometer wherein the shaft means 37 is adjustable throughout eleven turns to carry the adjustable tap from one limit of the resistance element to the other. The voltage $e_1$ from the integrator circuit on the conductor means 28, the voltage $e_2$ on the conductor means 31 from the target range potentiometer 30, and the voltage $e_3$ applied by way of conductor means 36 from the feedback potentiometer 35, are added in an adding circuit 38, the summed voltage being taken from the output conductor means 39. The summed voltage $e_1+e_2+e_3$, constituting a resulting voltage, is chopped in a chopper circuit 40 and applied to a servo motor 41 through a servo amplifier 42 to drive a principal gear wheel 43 having, in this illustrated example, 90 teeth. The servo motor 41 drives the principal gear wheel 43 through the shaft means 37 which likewise drives the feedback potentiometer 35. The servo motor system strives to reduce the voltage $e_1+e_2+e_3$ to zero at which time the principal gear wheel 43 will be brought to rest. As may be understood from the prior description, whenever the normally open switch 26 is depressed to apply the target speed voltage to the integrator, the integrator 27 will produce an output voltage $e_1$ in a linear manner from zero potential upwards or downwards at a slope angle established by the target speed potentiometer 21 potential. That is, if V be the adjusted voltage from the tap of potentiometer 21, $e_1$ will be equal to the integral of V with respect to time, or $$e_1 = \int_0^t V dt \qquad (1)$$

This varying voltage $e_1$ is added to the voltage $e_2$ which voltage $e_2$ is proportional to the initial range voltage $R_0$. This results in the summed voltage $$e_1 + e_2 \propto R_T + R_0 + A \int_0^t V dt = R_0 + A V t \qquad (2)$$

for constant simulated speed provided as the constant analog speed voltage, where $R_T$ is the actual range in nautical miles or the desired range delay being the range of the artificial target from own position at a time $t$ and A is the constant scale factor required to convert voltage $e_1$ to range. This linearly changing voltage $e_1$, operative in the adding circuit 38 to add $e_2$, produces a changing voltage in the servo motor system to drive the feedback potentiometer in a direction to approach the null point to bring the voltage $e_1+e_2+e_3$ to zero.

The principal gear wheel 43 is in mesh with three smaller gear wheels 45, 46, and 47, each of which drive continuously rotatable delay voltage potentiometers 48, 49, and 50, respectively. For the purpose of an illustrative example herein, the small gear wheel 45 is a 9-tooth gear, the small gear wheel 46 is a 10-tooth gear, and the small gear wheel 47 is an 11-tooth gear. Each of the small gear wheels 45, 46, and 47 is mechanically coupled by shaft means to the adjustable taps of the delay voltage potentiometers 48, 49, and 50, respectively, whereby each of these potentiometers may be rotated in cycles throughout 360° over the voltage range applied to the resistance means. Each of the delay voltage potentiometers has the resistance means thereof coupled between a positive voltage source and ground with the voltage level of each being in accordance with the maximum delay requirements for the respective PRF. The adjustable tap of the delay voltage potentiometer 48 is coupled through a conductor means 51 to a switch contact 52, the delay voltage potentiometer 49 has the adjustable tap thereof coupled by way of a conductor means 53 to a switch contact 54, and the delay voltage potentiometer 50 has the adjustable tap thereof coupled by way of a conductor means 55 to a switch contact 56. A switch blade 57 for contacting the switch contacts 52, 54, and 56, is connected through a conductor means 58 to a delay multivibrator 59, the purpose of which will soon be described. The switch blade 57 is mechanically coupled by means 60 to a PRF stepping relay control means 61, the energization of which is under the control of a control voltage conducted by way of the conductor 62 from a terminal 63 to which a PRF number control voltage is applied from the pulse radar (not shown) in which this target simulator is incorporated. The switch elements 52, 54, 56, 57, 60, and 61 constitute a PRF selector switch 64. While the present invention illustrates delay voltage potentiometers to provide delay voltages for three different PRF's of a pulse Doppler radar, it is to be understood that the invention is equally applicable to one, two, three, or more PRF's of a pulse Doppler radar. It is also to be understood that while the gear wheels are specified as having a certain number of teeth, these may be in different sizes and ratios with the gear wheel 43 to be adapted for particular uses or different radar PRF's.

The delay multivibrator 59 is of the monostable type which is triggerable to one of its states by pulses conducted over the conductor means 70 to the monostable delay multivibrator 59 from a terminal 71. The terminal 71 is adapted to be connected to the pulse Doppler radar transmitter modulator (not shown) so that these pulses are applied to the monostable delay multivibrator 59 to trigger it to its unstable state. Delay multivibrator 59 will remain in its unstable state for a time determined by the amplitude of the voltage applied by way of the conductor means 58 to operate in the resistance-capacitance network thereof to cause the delay multivibrator 59 to trigger to its stable state. This operation produces a substantially square wave, the trailing edge of which is differentiated and clipped in a differentiator and clipper circuit 73 to produce a trigger pulse on the output conductor 74 applied to a pulse generator circuit 75. The pulse generator 75 is constructed and arranged to generate simulated received pulses on the output 76 which are applied to the modulator 24 to amplitude modulate the frequency $f_0+f_d$ coming by way of the conductor means 23. The simulated received pulses being applied over the conductor means 76 are delayed with respect to the pulses applied by way of the conductor means 70 to the delay multivibrator 59 a proper amount for the selected PRF of the radar operable through the terminal means 63 to set the selector switch 64. This delay voltage is operative in the delay multivibrator 59 to produce pulses each of a width corresponding in time to some amount less than the time between pulses for that selected PRF. By virtue of the integrator 27 producing a linear voltage changing at a rate proportional to the amplitude of the target speed voltage set by the potentiometer 21, the servo system will drive in an effort to reduce the voltage $e_1+e_2+e_3$ to zero to produce a continuous drive of the respective delay voltage potentiometer from minimum to maximum and back through minimum-to-maximum as many times as the driven small gear wheel is rotated. For the switched position of selector switch 64 as shown in the figure of the drawing, delay voltage potentiometer 50 is supplying the delay voltage to the delay multivibrator 59 through the switch blade 57 which will cause the width of the delay multivibrator pulse on the output 72 to vary and, accordingly, vary the point of amplitude modulation of the variable frequency $f_0+f_d$ coming to modulator by way of conductor means 23. The modulator 24 output is by conductor means 77 which, when applied to the IF circuits of the radar receiver, will produce a moving target, closing or opening, in accordance with the adjustable tap position of the target speed potentiometer 21. Each delay voltage potentiometer will rotate its adjustable tap to cause this simulated IF target signal to vary from the maximum point between transmitted pulses for its PRF to a minimum position and then back through maximum to minimum position again for that PRF. The voltages applied to potentiometers 48, 49, and 50, are such that the delay voltage from the selected potentiometer produces the correct delay in multivibrator 59 in correspondence with the PRF selected. The delay voltages need only to delay the transmitter modulator pulses sufficiently to keep the simulated received target pulses within the time interval between pulses of the PRF which they are delaying. Assuming that it takes 12.364 microseconds ($\mu$sec.) for an electromagnetic wave to travel one nautical mile, the radar transmitter modulator pulses should each be effectively delayed by the product of the actual range to the target ($R_T$) and the travel time per unit range for the pulse, or $$T_{RT} = (12.364)(R_T) \; \mu\text{sec.} \tag{3}$$

Since the radar transmitter modulator pulses recur every $$\frac{1}{PRF}$$

seconds, the maximum delay required in the simulator designed is $$\frac{1}{PRF} = T = 1.6\text{N} \; \mu\text{sec.} \tag{4}$$

where T is the maximum delay time, PRF is the fundamental reference frequency used for an example herein as 625 kilocycles, and N is the multiplier of the range measuring unit or pulse width, for example, 1.6 $\mu$sec. In this example, let $N_1$ be the multiplier for the nine-tooth gear wheel 48, let $N_2$ be the multiplier for the ten-tooth gear wheel 49, and let $N_3$ be the multiplier for the eleven-tooth gear wheel 50. Using the example of the multiplier $N_1$, instead of delaying the PRF by the time in Formula 3, the time delay may be only $$T_{TR} = (12.364 R_T - 1.6 N_m) \; \mu\text{sec.} \tag{5}$$

where $m$ is the largest integer which gives a positive time delay. The time delays for $N_1$, $N_2$, $N_3$ may be found by substituting $N_1$ or $N_2$ or $N_3$ multiplier factors in the relation (5) for N. The time delay will then produce the simulated pulse within the time occurrence of successive transmitter modulator pulses for the PRF selected.

Also for the purpose of example let it be assumed that the pulse Doppler radar with which this target simulator is to be used has a maximum range of 128 nautical miles. This range of 128 nautical miles is represented in an analog voltage from the 11-turn feedback potentiometer 35 from the maximum to minimum limits requiring 11 turns of the principal gear wheel 43. Rotation of the principal gear wheel 43 11 turns for maximum range will cause 990 teeth to pass a particular point adjacent the circumference to represent full range of the radar. The small driven gear wheel 45 having nine teeth thereon will therefore be turned 110 times, the small gear wheel 46 having ten teeth thereon will be turned 99 times, and the small gear wheel 47 having eleven teeth thereon will be turned 90 times. The number of revolutions of the small delay potentiometers 48, 49, and 50 can be determined from the relationship $$n = \frac{990 R_T}{128 N} \tag{6}$$

and, $N_1$, $N_2$, and $N_3$ can be substituted for N to find the number of turns $n_1$, $n_2$, and $n_3$ of the gear wheels 45, 46, and 47, respectively. Since $R_T$ for the maximum range would be 128, this formula for each of the multipliers becomes $$n_1 = \frac{990}{N_1} \quad n_2 = \frac{990}{N_2} \quad n_3 = \frac{990}{N_3} \tag{7}$$

For the purpose of example and without any limitation as to the scope of this invention, the PRF for which the delay potentiometer 48 is designed to give delay voltage may be of the order of 69.444 kilocycles (kc.), the PRF for which the delay potentiometer 49 is designed may be of the order of 62.5 kc., and the PRF for which the delay potentiometer 50 is designed may be of the order of 56.818 kc. It is pointed out that these three PRF's are in a 9, 10, 11 relationship, for example $$PRF = \frac{625}{N} \; \text{kc.} \tag{8}$$

where N is the multiplier $N_1$, $N_2$, or $N_3$, as used in Formula 4 and 625 kc. is the fundamental reference frequency. Replacing N with $N_1$, $PRF_1$ is found to be 69.444 kc. Replacing N with $N_2$ and $N_3$, $PRF_2$ and $PRF_3$ are found to be 62.5 kc. and 56.818 kc., respectively. It may be understood that in the operation of the portion of the invention above described, for the PRF selected by the selector switch means 64, the delay voltage potentiometers can revolve continuously to give from zero to maximum delay and then drop back to zero delay and repeat this cycle for its PRF so that the simulated target will always vary in its range, speed, and direction within the occurrence of the transmitted pulses. This produces a modulated IF which, in the radar video circuits, will produce a simulated target on the target tracking indicator as going through repeated cycles of simulated range tracking operations regardless of changes of PRF, as will become clear in the description of operation.

A potentiometer 80, having the resistance element thereof coupled between a positive voltage and ground, produces on the adjustable tap thereof and over the conductor means 81 a voltage representative of the azimuth of the artificial target. The azimuth target voltage on conductor means 81 is applied to a monostable multivibrator 82 to which is also applied the antenna scan markers by way of a conductor means from a terminal 83 which terminal 83 may be connected to the antenna scan marker circuits of the pulse Doppler radar (not shown). The antenna scan markers establish the beginning of the antenna scan in each of its scanning motions which markers are spike voltages that are applicable to the delay multivibrator 82 to trigger it to its unstable condition. The target azimuth voltage coming by way of conductor 81 is operative to trigger the delay multivibrator 82 to its stable condition after a time proportional to the amplitude of the target azimuth voltage. The delay multivibrator produces an output pulse on the conductor means 84, the pulse width being dependent on the amplitude of the target azimuth voltage. The trailing edge of this pulse is operative in a pulse generator circuit 85 to produce a pulse on its output 86 applicable to the modulator 24 to turn this modulator "on" to allow a simulated target signal to occur during the time required to simulate the antenna dwell time on the artificial target. The modulator 24 may be of any well-known type to modulate the $f_o + f_d$ frequency with means therein to switch the modulator into and out of operation as the generated pulses from pulse generator 85 are applied. Where a differentiating and clipping circuit is not built into the generator circuit 85, a separate differentiator and clipper circuit similar to 73 may be used preceding the generator 85 to accomplish the generation of good dwell time azimuth signals. The output of the modulator 24 on the conductor 77 may then be applied to the IF circuits of the radar receiver (not shown) which will be capable of presenting a target on the visual indicators such as a PPI, or the like, to simulate the speed, direction, azimuth, and range of an artificial target in space. If an operator has been viewing the screen for an extended period of time, he may become fatigued to the appearance of any target whereupon this target simulator may be switched on for a few minutes and the pulse Doppler radar switched off for an equal length of time to permit presentations to be made on the radar indicators to reaffirm the operator's ability to see and evaluate targets. At the same time such a target simulator means may be used to test the operability of the radar system to determine its ability in the accurate display of actual targets.

*Operation*

In the operation of this device, let it be assumed that the PRF control voltage applied to the terminal 63 has operated the step relay 61 to switch the switch arm 57 of the selector switch 64 to the position as shown to receive the delay voltages from the delay potentiometer 50. The target speed potentiometer 21, the target range potentiometer 30, and the target azimuth potentiometer 80 may be adjusted to any desirable position to produce the simulated target most effective for operator and radar check. The depression of the switch 26 produces integration of the potential adjusted into the target speed potentiometer 21 to produce the linearly varying voltage $e_1$ which is added to the voltages $e_2$ and $e_3$ to produce operation of the servo motor system 41 through the chopper circuit 40 and the servo amplifier 42 to drive the feedback potentiometer 35 and the delay voltage potentiometer 50. Transmitter modulator pulses applied to the terminal 71 from the pulse Doppler radar (not shown) in which this target simulator is used produce delayed transmitted pulses in the circuit elements 59, 73, and 75 which are applied to the modulator 24. The variable frequency oscillator 20 is producing alternating voltage at a frequency $f_o+f_d$ determined by the adjustment of the target speed potentiometer 21. If the target speed potentiometer 21 is above the voltage at which the variable frequency oscillator would produce the center IF of the radar transmitter, the variable frequency oscillator 20 will produce voltage oscillations above the center IF which will present the target on the target radar receiver indicators as a "closing" target. If the target speed potentiometer voltage is adjusted to a potential below the potential required to hold the variable frequency oscillator 20 at the center IF, the variable frequency oscillator will produce voltage oscillations at a frequency lower than the IF which will produce a simulated target on the indicators of the radar receiver indicating the target is "opening" or traveling away from own position. The modulator 24 will be turned on and off by the pulses coming from the pulse generator 85 which pulses are established in delay from the actual radar antenna beginning-of-scanning positions established by the variable delay multivibrator 82 in accordance with the voltage adjustment of the target azimuth potentiometer 80. The simulated targets will appear on the indicators of the radar receiver as objects moving in accordance with the speed established by the amplitude of the voltage from target speed potentiometer 21 and in a direction determined by the polarity of the target speed potentiometer voltage at a starting or initial range established by the range potentiometer 30 and in an azimuthal direction established by the adjustment of the azimuth potentiometer 80. As the delay potentiometers 48, 49, and 50 are rotated, the voltage from the selected potentiometer by relay selector switch 64 will produce a varying delay in the multivibrator 59 to cause amplitude modulation of the IF in modulator 24 for that PRF. These video circuits of the radar (not shown) coupled to the output conductor 77 will produce a simulated target on the radar indicator (not shown) which will originate at the range set by control 30 and travel in the direction and at a speed set by the control 21 to its limit of travel; that is, to own station or out to maximum range. This sequence will be repeated for as many times as the selected potentiometer 48, 49, or 50 rotates until the integration of integrator 27 is completed. Opening and reclosing of switch 26, with or without new adjustments of controls 21, 30, and 80, will start a new sequence of operations. Switching of the PRF's during a sequence of operations produced by engagement of switch 26 will not interfere with the simulated target display since the gears 43, 45, 46, and 47 maintain the proper proportionality for the PRF changes. Such simulated moving targets will renew the operator's ability to see and evaluate the targets as well as to check the operability of the pulse Doppler radar system.

While many modifications and changes may be made in the constructional details and arrangements of parts to adapt this target simulator for particular radar systems without departing from the spirit and scope of this invention, applicant desires to be limited only by the spirit and scope of the appended claims.

I claim:

1. A target simulator circuit for pulse Doppler radar comprising: means producing variable frequency oscillations; means adjustable to vary an analog voltage representative of speed and direction of motion of a simulated target coupled to said variable frequency oscillator means to adjustably vary said oscillations; means coupled to said analog voltage to integrate same; means coupled to receive said integrated analog voltage and to receive an analog range voltage to produce a delay voltage in accordance with their sum; means coupled to receive transmitted pulses from a pulse Doppler radar and delay same in accordance with the amplitude of said delay voltage coupled thereto; and means amplitude modulating said frequency oscillations with said delayed transmitted pulses whereby amplitude modulated signals are produced simulating a target object in range, speed, and direction of motion.

2. A target simulator circuit for pulse Doppler radar comprising: variable frequency oscillator means; an adjustable voltage means providing simulated speed voltage of a target coupled to vary the oscillations of said variable frequency oscillator; means coupled to said adjustable voltage means to integrate said simulated speed voltage; delay means coupled to receive transmitted pulses of a Doppler radar for delaying same in accordance with a delaying voltage; driven means to drive in accordance with a control voltage to establish said delaying voltage, said delaying voltage being coupled to said delay means; means combining said integrated simulated speed voltage and a simulated range voltage of the target to produce a control voltage, the latter control voltage being applied to said driven means; modulator means in the output of said variable frequency oscillator means coupled to receive the delayed Doppler radar pulses to modulate said variable frequency by said delayed Doppler radar pulses; and means producing simulated azimuth voltage of the target referenced to the antenna position of the pulse Doppler radar to establish azimuth pulses, said azimuth pulses being applied to said modulator means to turn on same whereby the modulator means output provides a simulated modulated signal in accordance with the simulated speed, range, and azimuth of a simulated target.

3. A target simulator circuit as set forth in claim 2 wherein said driven means includes a servo system controlled by the control voltage of said combining means output, said servo system being mechanically coupled to drive potentiometers producing variable voltages, one variable voltage potentiometer output being fed back to said combining means to be combined with said integrated simulated speed and range voltages, and the other potentiometer outputs comprising said delaying voltage.

4. A target simulator circuit as set forth in claim 3 wherein said other potentiometers are each driven proportional to corresponding pulse repetition frequencies transmitted by a pulse Doppler radar, the outputs of said other potentiometers each being said delaying voltage, said outputs including a selector switch means and said delaying voltage is selectable through said selector switch means for application to control the time delay of said delay means.

5. A target simulator circuit as set forth in claim 4 wherein said means producing simulated azimuth voltage referenced to the antenna position of the pulse Doppler radar includes a variable delay means initiated into operation to produce a delay pulse on a signal received from the radar antenna which delay pulse is terminated by operation of said simulated azimuth voltage, and a generator means coupled to said variable delay means for developing a delayed azimuth pulse upon the termination of said delay pulse, the latter delayed azimuth pulse being one of said azimuth pulses of which is applied to said modulator means.

6. A target simulator system for pulse Doppler radars comprising: a variable frequency oscillator for producing voltage oscillations in the intermediate frequency range; an adjustable voltage means providing a simulated speed voltage of a simulated target, the polarity of said simulated speed voltage being determinative of simulated target direction, said simulated speed voltage applied by coupling to said variable frequency oscillator to vary the oscillations thereof; an integrator coupled through a switch means to said adjustable voltage means to integrate said simulated speed voltage; an adjustable simulated negative range voltage means of the simulated target; a feedback potentiometer for feeding back positive voltage; a voltage combining means coupled to receive the voltage from said integrator, said feedback potentiometer, and said adjustable simulated range voltage means producing a resulting voltage; a servo system coupled to said combining means and driven by said resulting voltage to reduce said resulting voltage to zero, said servo system being coupled to drive said feedback potentiometer and delay potentiometers, said delay potentiometers each being driven at a ratio to produce a voltage output representative of a delay voltage for each pulse repetition frequency of pulse Doppler radar, and the delay potentiometer delay voltage outputs being coupled to a selector switch to select the delay voltage output on an output thereof; a delay signal means receiving transmitted signals from a pulse Doppler radar and coupled to said selector switch output to receive the selected delay voltage to produce delayed signals; a modulator coupled to receive the voltage oscillations from said variable frequency oscillator and the delayed signals from said delay signal means to modulate said voltage oscillations; and means producing simulated azimuth position and target dwell time voltage pulses coupled to said modulator to turn the latter on for modulation operation, the output of said modulator being useable for coupling to the intermediate frequency circuits of a pulse Doppler radar receiver whereby a target is capable of being simulated in radar receiver circuits to provide speed, direction, range, and azimuth position.

7. A target simulator system as set forth in claim 6 wherein said delay signal means includes a monostable multivibrator that is triggered to its unstable condition by transmitted signals from the pulse Doppler radar and triggered to its stable condition by said delay voltage, the time interval between said unstable conidtion and said stable condition being in accordance with the amplitude of said delay voltage, and a pulse generator responsive to produce a pulse applied to said modulator upon the occurrence of said monostable multivibrator to its stable condition.

8. A target simulator system as set forth in claim 7 wherein said means producing simulated azimuth position and target dwell time voltage pulses includes a monostable multivibrator that is triggered to its unstable condition by antenna scan pulses indicative of the beginning of antenna scan of a pulse Doppler radar and triggered to its stable condition by a preset voltage representative of target azimuth, triggering to said stable condition being after a time interval determined by the amplitude of said preset voltage, and a pulse generator responsive to the switch of said monostable multivibrator to its stable condition to produce a pulse representative of azimuth position dwell time on a simulated target to turn on said modulator.

9. A target simulator system as set forth in claim 8 wherein said servo system includes a servo motor driving a driving gear wheel on a shaft also driving said feedback potentiometer, each said gear wheel and said feedback potentiometer being rotatable throughout eleven turns, said driving gear wheel gear driving potentiometer gear wheels directly driving respective delay potentiometers throughout three hundred and sixty degrees to vary said delay voltage respectively from zero to maximum voltage, said potentiometer gear wheels each being in a gear ratio with said driving gear wheel proportional to the selected pulse repetition frequency to develop said delay voltages applied to said signal delay monostable multivibrator.

10. A target simulator system as set forth in claim 9 wherein said selector switch is a relay switch positioned by the pulse repetition frequency control voltage of a pulse Doppler radar, said selector switch being positioned to apply delay voltage from the delay potentiometer establishing the proper delay in said delay signal monostable multivibrator for the pulse repetition frequency applied to trigger said delay signal monostable multivibrator to said unstable position.

11. A target simulator system for pulse Doppler radars comprising: a variable frequency oscillator for producing voltage oscillations in the intermediate frequency range in accordance with the amplitude of control voltage applied; an adjustable voltage means providing a simulated speed voltage of a simulated target, the polarity of said simulated speed voltage determinative of simulated target direction of opening and closing with respect to said target simulator system, said simulated speed voltage being applied as the control voltage to said variable frequency oscillator to vary the voltage oscillations thereof; an integrator coupled through a switch to said adjustable voltage means to integrate said simulated speed voltage on an output thereof; an adjustable simulated negative range voltage means of said simulated target; a feedback potentiometer for producing feedback positive voltage; a voltage adding network coupled to add the voltages from said integrator, said feedback potentiometer, and said adjustable negative range voltage means producing a resulting voltage on the output thereof; a servo system having a servo motor coupled to receive said resulting voltage to control same in a direction corresponding to the polarity of said resulting voltage, said servo motor shaft coupled to a driving gear and to the movable tap of said feedback potentiometer to drive same in a direction to reduce said resulting voltage to zero, and said driving gear being in mesh with a plurality of driven gears coupled to drive the movable taps of corresponding delay potentiometers, the gear ratios between the respective driven gears and driving gear and the number of pulse repetition frequencies being in direct correspondence with the ratio of the pulse repetition frequencies with each other and with the number of pulse repetition frequencies applied to produce proper delay voltages for each pulse repetition frequency; a program controlled selector switch coupled to selectively connect the movable taps of said delay potentiometers to a single output; a delay monostable multivibrator coupled to receive modulator pulses from a pulse Doppler radar transmitter to place said delay multivibrator in its unstable state, and coupled to said single output of said selector switch to place said delay multivibrator in its stable state after a time interval proportional to the amplitude of the applied delay voltage; a pulse generator coupled to said delay multivibrator output responsive to a voltage output therefrom upon change to said stable state; a modulator coupled to said variable frequency oscillator to receive said voltage oscillations and coupled to said pulse generator to receive pulses therefrom modulating said voltage oscillations, said modulator having an output coupled to the intermediate frequency circuits of a pulse Doppler radar receiver; and a means producing simulated azimuth position and dwell time voltage pulses of said simulated target coupled to said modulator to turn said modulator on for modulation operation whereby a target can be simulated in pulse Doppler radar receiver circuits to provide speed, direction, range, and azimuth simulated information.

12. A target simulator system as set forth in claim 11 wherein said coupling of said pulse generator and said delay multivibrator includes a differentiating and clipping network to clip the leading edge and to differentiate the trailing edge of the delay multivibrator voltage wave output.

13. A target simulator system as set forth in claim 12 wherein said means producing azimuth position and dwell time voltage pulses includes a monostable multivibrator set to its unstable state by antenna marker pulses from a pulse Doppler radar to establish the beginning of each antenna scan and set to the stable state by a preset voltage means representing the azimuth position of said target, and a pulse generator responsive to the voltage output of said multivibrator in changing to said stable state for each marker pulse to produce corresponding said dwell time voltage pulses.

14. A target simulator system as set forth in claim 13 wherein said adjustable voltage means providing a simulated speed voltage, said adjustable simulated negative range voltage means, and said preset voltage means are each potentiometers.

No references cited.

CHESTER L. JUSTUS, *Primary Examiner.*

---

UNITED STATES PATENT OFFICE
CERTIFICATE OF CORRECTION

Patent No. 3,162,854            December 22, 1964

Robert R. Campbell

It is hereby certified that error appears in the above numbered patent requiring correction and that the said Letters Patent should read as corrected below.

Column 3, line 44, the equation should appear as shown below instead of as in the patent:

$$e_1 + e_2 \propto R_T = R_0 + A\int_0^t V dt = R_0 + AVt$$

Signed and sealed this 18th day of May 1965.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,162,854                      December 22, 1964

Robert R. Campbell

It is hereby certified that error appears in the above numbered patent requiring correction and that the said Letters Patent should read as corrected below.

Column 3, line 44, the equation should appear as shown below instead of as in the patent:

$$e_1 + e_2 \propto R_T = R_0 + A\int_0^t V dt = R_0 + AVt$$

Signed and sealed this 18th day of May 1965.

(SEAL)
Attest:

ERNEST W. SWIDER
Attesting Officer

EDWARD J. BRENNER
Commissioner of Patents